Figure 1:
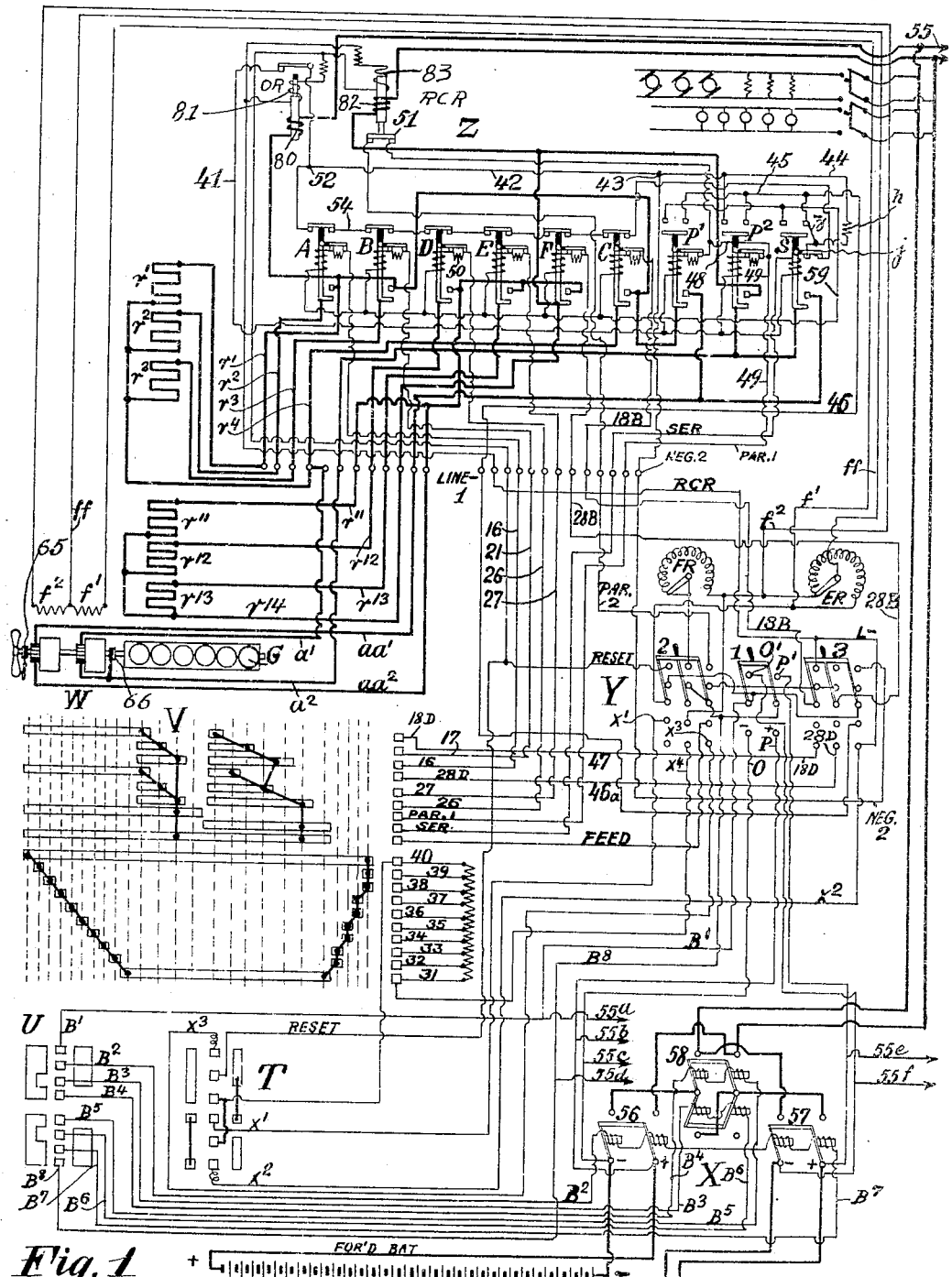

G. A. PIERCE.
DISTANT CONTROL SYSTEM FOR ELECTRIC MOTORS.
APPLICATION FILED AUG. 9, 1911.

1,133,663. Patented Mar. 30, 1915.
2 SHEETS—SHEET 1.

G. A. PIERCE.
DISTANT CONTROL SYSTEM FOR ELECTRIC MOTORS.
APPLICATION FILED AUG. 9, 1911.

1,133,663.

Patented Mar. 30, 1915.

George A. Pierce, Inventor

UNITED STATES PATENT OFFICE.

GEORGE A. PIERCE, OF PHILADELPHIA, PENNSYLVANIA, ASSIGNOR TO WILLIAM CRAMP & SONS SHIP & ENGINE BUILDING COMPANY, OF PHILADELPHIA, PENNSYLVANIA, A CORPORATION OF PENNSYLVANIA.

DISTANT CONTROL SYSTEM FOR ELECTRIC MOTORS.

1,133,663.   Specification of Letters Patent.   Patented Mar. 30, 1915.

Application filed August 9, 1911. Serial No. 643,160.

*To all whom it may concern:*

Be it known that I, GEORGE A. PIERCE, a citizen of the United States, residing at Philadelphia, in the county of Philadelphia and State of Pennsylvania, have invented certain new and useful Improvements in Distant Control Systems for Electric Motors, of which the following is a full, clear, and exact specification.

This invention relates to a distant control system for electric motors, its object being to regulate their speed and running direction from any desired point by independent operating and governing circuits.

The invention is especially adapted for use with a storage battery as the source of current supply, and provides means for charging the batteries, when necessary, by a prime mover driving the motors as generators. Certain parts of the invention may, however, be used in distant control systems from any other source of supply. A very important use of the invention is on isolated plants, and for this reason it is particularly adapted for ship propulsion and especially submarines where it is essential to a good working operation to govern the movements of the vessel from some particular point irrespective of the location of the apparatus which delivers and converts the current into power and to provide for charging the batteries by the electrical machinery in the vessel when cruising on the surface or at the dock.

To these ends, my invention comprises a group of motors and adjacent contactor panel through which they are supplied with current, a switchboard equipment for connecting the batteries in various relations to the motors either for the renewal of the charge or the supply of power, and hand operated controlling mechanism located at any desired distance to connect these several pieces of apparatus in proper working relation.

It comprises also an equipment of the kind outlined above in combination with overload and reverse current protective devices to insure the opening of the circuits when dangerous conditions arise.

In carrying out my invention I provide a source of electric energy as storage batteries with means for coupling them in charging and discharging relation to an electric unit or units, acting as desired either as a generator or motor, with means for connecting the unit either with a prime mover or propelling apparatus, the charging or power connections being made by a group of magnetically operated switches in control circuits leading to a distant station; by these means the navigator is given absolute control of the movements of the vessel and of the condition of the source of supply and the direction or speed of propulsion may be varied at will.

I preferably employ in the main circuit, at a point close to the motors and to the source of supply, a contactor panel with a sufficient number of automatic switches of breaking capacity to give effective and safe control, a motor switchboard, and a battery switchboard, all connected with a master controller by a group of small wires, thus providing at the navigator's station absolute command of the movements of the vessel. I preferably provide four electric units, one pair acting on the starboard, and the other on the port propeller, and two prime movers, one for each pair, by which they may be driven when connected to act as generators, and to this end I provide for each pair two couplings or clutches, one to connect with the prime mover and the other with the propeller. I also prefer to provide two separate batteries or sources of voltage supply subject to the automatic switch control already referred to, by which they may be connected in series or parallel and in charging or discharging relation to the lectric units and whereby either may be a reserve in case of damage to the other. I preferably employ a compound hand operated master controller consisting of a reversing and speed controller operated by a handle common to the two, and an auxiliary battery controller, both of these devices or duplicates being at the control station or stations where the movements of the vessel are directed, communication with the controlled apparatus located in the hold of the vessel being by means of a cable of small control wires above referred to. The speed of the motors is varied by armature and field resistance, and series or parallel connection to the motor units, as well as series or parallel relation of the two supply sources, the field magnets of the units being excited by battery current, and the motor loads equalized by an equalizing rheostat on the switchboard, whose compensating resistance may be adjusted to the best working relation. This rheostat serves the dual function of equalizing the load of the propelling units, and acting as a discharge resistance for the field magnets when the motor circuits are opened. The navigator may from a control station place either pair of units on either source of current supply in case it should be necessary through the disablement of either of the storage batteries. In connection with the automatic contactors for varying the resistance of the armature circuits of the propelling units, and for coupling them in series or parallel to vary the speed, I provide for additional speed variation through series or parallel battery connection, and a field resistance governed by the master controller to weaken the strength of the field magnets of the motors, and thus further increase the speed variation by about twenty-five per cent. On the contactor panel for providing the desired armature connections, I employ nine automatic switches or contactors, a reverse current relay for opening the circuit in case of reverse flow of energy from the batteries, and an overload relay to afford necessary safety when the motors function either as generators or as motors; and to render these auxiliary devices effective I provide for resetting the overload circuit breaker, in case it operates, when the controller is brought to the off position. By operating the master controller, the motors are first brought to half speed through a number of starting points, then to full speed in parallel through the same starting points, and then to maximum speed by weakening the motor fields. The motor switchboard is provided with a group of double throw switches, these switches when in one position putting the batteries in charging relation to the motors through the contactors which serve as automatic circuit breakers and in the opposite position placing the contactors in circuit with the master controller, contactor panel and motors in discharging relation. In my preferred embodiment the reverse current and overload relays are provided with compound windings, one being a potential coil across the battery terminals, and the other a coil in series with the line. In the overload relay the potential coil serves to hold the relay in position to break the main circuit after it has been lifted by an excess current in the coil in series in the main circuit. In the reverse current relay the potential and series coils oppose each other when the batteries are being charged and the relay remains in position to keep the charging circuit closed. If the current in the charging circuit should reverse, the potential and series coils would act in conjunction and, lifting the relays, cause the main circuit to open. Auxiliary distribution circuits are provided for connecting the source with lighting, power, and heating circuits throughout the vessel.

My invention embodies various novel features in the system outlined above, which will be definitely indicated in the claims appended to this specification.

Figure 2:
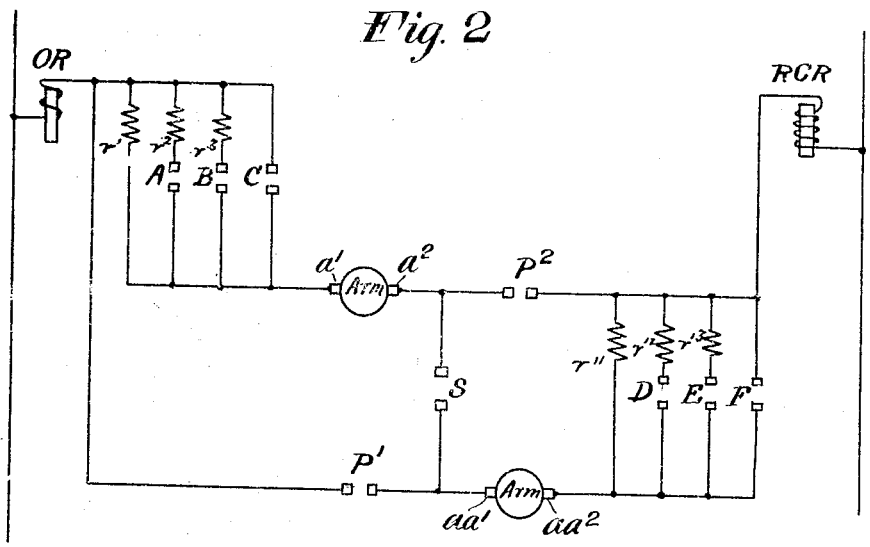
Figure 3:
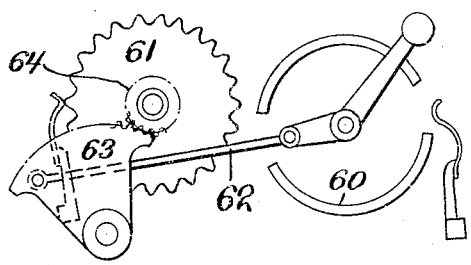

In the drawings Figure 1 illustrates diagrammatically the different control and operating circuits, and the several types of apparatus I employ for operating one motor unit; Fig. 2 is a simplified diagram of the motor circuits and line switches for varying the power and speed; and Fig. 3 is a detail view showing the form of master controller I prefer to employ.

Referring now to Fig. 1, the diagram shows one half of the complete operating equipment for my control system as particularly adapted for use in controlling a submarine vessel. As the other half is identical, except for certain parts common to the two, as the batteries and their control apparatus, it is deemed unnecessary to illustrate it. The broken bus-bars indicated at 55 and the dotted leads $55^a$, $55^b$, $55^c$, $55^d$, $55^e$, $55^f$, the latter being connected with a duplicate motor switchboard similarly o Y lead to an identical equipment, both e uipments being supplied by the common pair of batteries or multiple voltage source and the common battery switchboard X. The motor switchboards are indicated at Y, the main contactor panels at Z, power and charging units at W, and a master control apparatus at V, and reversing controller at T.

Each contactor operating coil is connected with its own finger on the master controller; some of these circuits are led through the motor switchboard as I prefer to use some of the contactors to function as circuit breakers when the motors are operating as generators to charge the batteries, and these are supplied in the battery charging position of the switch direct, and in the discharge position of the switch through the master controller, and its contact fingers. The various motor connections will be apparent from an inspection of Fig. 2, from which it will be seen that when the series contactors are closed both armatures are connected in series through a resistance on each side of the line, and the resistance may be cut down by closing contactors A, B, C, D, E, F, by steps, then opening them and repeating the operation with the parallel contactors $P^1$ and $P^2$ closed and S opened.

It will be seen from the developed master controller shown on the diagram that there are twenty-one steps, eleven of which are used for the series and parallel connections of the motors, and ten to cut in the motor field resistance to increase its speed.

FR and ER are field and equalizing rheostats for adjusting and balancing the fields of say the port driving units W. The battery switches for connecting the source of supply in series or parallel are magnetically operated as seen at X, one being double throw to provide series or parallel connection, and coöperating with the master battery controller shown at U, and the hand operated switches on the motor switchboard Y to permit complete regulation of the motors either as translating or charging devices over circuits which will be hereinafter fully traced. The battery controller U, and the motor and field reverse controller T, I have shown developed, and as will be apparent the field reverse and battery controller have two positions, right and left, and the speed controller progressively cuts in the automatic switches, and cuts out armature resistance with the two units acting in series, then cuts in the resistance and couples the motors in parallel, then cuts out the resistance again and progressively weakens the strength of the field magnets. These several relations will be more readily understood by tracing the several operating conditions of the motor. The wires connecting plus and minus poles of the two batteries with battery switchboard X are duplicated on the companion motor switchboard corresponding to Y, and the leads from the companion motor switchboard and the battery control cylinder U, also are in indentical relation. These leads are indicated in dotted lines at $55^a$, $55^b$, $55^c$, $55^d$, $55^e$, and $55^f$.

The switches 1, 2, 3 of the port motor switchboard Y are double throw, and when thrown to the up position place the batteries in charging relation to the port motors, (acting as generators) and close the circuit to the port motor fields, completing the circuit also through the overload and reverse current relays and certain of the contactors on the port contactor panel, as will be hereinafter described. When these switches are thrown to the down position, the batteries are put in discharging relation to the motors through the master controller, and as the handle of the latter is turned the proper contactors are operated to throw the battery upon the motor armatures through the regulating resistances. The operation of the battery connecting cylinder U connects the battery sections to the bus-bars in series or parallel. Switch No. 1 gives selective control on the motor switchboard of the two sources of supply, closing the control circuit on the aft battery in the up position and on the forward battery in its down position, so as to discharge either battery. This connects the motor fields and all auxiliary circuits to the battery through switches Nos. 2 and 3 on the motor board. Assuming that the battery connection cylinder U is thrown to the left for series relation and the switch 1 is closed in its down position, the supply will be connected for maximum speed over the following circuit: from the negative pole of the forward battery to contact O of switch 1, through the left arm of switch 1 to switch pivot and lead $B^1$, thence across the battery cylinder to lead $B^2$, thence from the automatic coil of switches 56, 57 to $B^7$, thence across the battery controller to $B^8$, and from $B^8$ to the right pivot of switch 1 and across the right arm of switch 1 to positive side of the battery. Automatic switch 58 is also closed in its down position over circuit $B^1$, $B^3$ and $B^6$, $B^8$. This operates the switches on the battery switchboard and connects the batteries in series. Assuming the battery controller to be thrown in the opposite direction the batteries would be connected in parallel for half speed over a circuit as follows: minus pole of forward battery O, left arm of switch 1 to left pivot, thence by $B^1$ and $B^2$, $B^4$, $B^5$, $B^7$, $B^8$, P, including coil of switch 58, plus pole of battery, closing the switch. The direction and speed handle (see Fig. 3) being moved forward operates the controllers V and T (Fig. 1) and gives the vessel ahead motion, the operating circuits being as follows:—The field magnet circuit may be traced from the negative pole of the forward battery to point O of switch 1, then to switch 3, wire $X^2$ to the field reversing cylinder T, thence by $X^1$, switch 2, $f^1$ to the field of motors W, through both fields in series and wire $f^2$ back to point $f^3$. Between the field and equalizing rheostats a wire $f'f$ extends from a point between the two fields to the pivot of the switch arm of the equalizer rheostat ER, thus permitting a relative adjustment or balance of the fields to be made. From the point $f^3$ in the field connections just traced, the circuit leads across the middle arm of switch 2, which is now on the down position, to wire $X^4$ to the lowermost contact 31 of the field resistance, thence through the field resistance to contact 40 and field reversing cylinder to $X^3$, thence to right arm of switch 2 to its pivot, thence to the right pivot of switch 1 and across right switch arm to plus pole of the battery.

For reversing the motion of the motors the connections are as follows:—negative pole of forward battery O, switch 1, switch 3, $X^2$, field reversing cylinder, contact 40 of field resistance, across resistance to contact 31, wire $X^4$, switch 2, $f^2$, fields, and equalizing rheostat as before, $f^1$, switch 2, $X^1$, field reversing cylinder $X^3$, right arm of switch 2, right pivot of switch 1 to positive pole of forward battery. The above reverse current through the fields gives an opposite direction of propulsion. Further movement of the handle in either direction revolves the master controller and cuts out field resistance connected between 40 and 31 building up the fields to full strength. When contact is made with 31, contact is also made with the feed and series connection through the contactors, thus starting the motors.

I will now trace the several controller positions and the control circuits for establishing them, and the operating motor circuits from the source of supply through the switches closed by the contactors.

*First controller position.*—From the positive side of the forward battery to point P, right arm of switch 1 to its pivot, thence to switch 2 and across its right arm to the contact, thence to the controller finger by lead marked "feed" and across the master cylinder to the series finger, thence to the operating coil of the series contactors to a wire 41 leading to the switch of the overload relay OR, and by wire 42 and wire 44 through a resistance at $h$ to point $z$ over the series contactor wire 46 to line minus 1, switch 3, switch 1, O, forward battery minus. This is a holding circuit for the series contactor which by reason of the resistance $h$ gives only current enough to hold the contactor closed but not enough to lift it. The lifting circuit is to point 52 as above traced thence by way of bridging contacts at the top of contactors A, B, C, D, E, F, over wire 54 to point $z$ and return by wire 46, this path not including the resistance $h$. This circuit actuates the plunger of the series contactor, closing an armature circuit as follows through the two motors in series. Plus pole of forward battery to the bus-bar, through the series coil 82 of reverse current relay RCR, resistance wire $r^{14}$, through resistance $r^{11}$, armature $aa^2$, $aa^1$ across the switch of contactor S, armature lead $a^2$, through the second motor armature to armature lead $a^1$, thence through section $r^1$ of the armature resistance, series coil 80 of overload relay OR to the bus-bar and negative pole of aft battery, thus putting both armatures in series with one section of resistance on each side in circuit, the position indicated in the simplified diagram of Fig. 2 when the series contactor alone is closed.

*Second controller position.*—In the second position the circuit may be traced from the positive pole forward battery to P, switch 1, switch 2, feed, master controller cylinder, and the series contactor coil as before, but cutting in also through the controller finger 26, the operating coil of contactor D, this circuit including in the return path an electrical interlock completed by the series contactor at $z$ to wire 46 and line minus 1, and thence to line minus 1, switch 3, switch 1 and the minus pole of the forward battery. This closes the switch of the contactor D and cuts in section $r^{12}$ of the armature resistance in parallel with section $r^{11}$ over the following path; positive pole of forward battery, reverse current relay series coil, frame of contactor F, wire $r^{14}$, armature resistance $r^{11}$ and $r^{12}$ (the latter by contactor switch D) armature and leads $aa^2$, $aa^1$, switch of contactor S, $a^2$, $a^1$, armature resistance $r^1$, overload relay, to negative main connected to the negative side of the aft battery.

*Third controller position.*—Positive side of forward battery P, switch 1, switch 2, feed finger, master controller, series finger and its lead, series contactor coil, wire 41, overload switch, wires 42, 43, 44, 45, 46 to negative pole of battery, as before; another circuit including coil of contactor D, through finger 26, and master controller, as before; a third through finger 16 and master controller to contactor coil A, and to the return point $z$ through the overhead bridging contact completed by the series contactor to the negative return. This operates the armature switch of contactor A, in addition to the contactors of the second position, and puts section $r^2$ of armature resistance in parallel with $r^1$, thus increasing the speed of the motors.

*Fourth controller position.*—Positive side of forward battery P, switch 1, switch 2, feed, master controller, series contactor coil, as before; finger 27, contactor coil E over the return route by the interlock before traced. In this controller position, contactors A and D are still held closed, and armature resistance $r^{13}$ is put in parallel with resistance $r^{11}$, and $r^{12}$, further increasing the motor speed.

*Fifth controller position.*—In this position contactor switch B is closed by engagement with finger 17, and contactors A D E and the series contactor being maintained closed over the paths before traced. This puts armature resistance $r^3$ and $r^2$ in parallel with $r^1$, thereby still further lowering the resistance in series with the armature.

*Sixth controller position.*—In this position the A B D E series contactors are still maintained, F contactor switch is closed by finger $28^D$, and wire $46^a$ to the motor switchboard, thence by wire $28^B$ to the operating coil of contactor F. This closes F, and as will be seen by the simplified diagram short circuits all resistances of armature $aa^2$ and further increases the speed of the motor.

*Seventh controller position.*—In this controller position contactor C is closed by way of finger $18^D$, wire 47, switch 3 on motor switchboard, wire 18ᴮ; thus short-circuiting through contactor C all the resistance of armatures $a^1$, $a^2$. In this position of the master controller all resistances in the armature circuits are cut out for the next position which is that of parallel connection of the motors.

*Eighth controller position.*—In this position the controller finger parallel 1 is engaged and contactors A B D E F C and S are opened, contactor coils $P^1$ and $P^2$ being energized over leads 48 and 49 and contactor operating coils to return by wires 41, 43, 44 z, 46, line minus 1 before traced. Switches $P^1$ and $P^2$ being closed, and A, B, C, D, E, F, being opened, the motors are now in parallel with all resistance cut in.

The ninth to the twelfth master controller position successively engages the fingers which control contactors A, B, C and D, E, F for the two motors in pairs, paralleling the resistances of A and D and B and E, and then short-circuiting them by the final closure of C and F, which places the motors in parallel with no resistance in the armature circuits. Further movement of the master controller then progressively disengages fingers 31 to 40, across which the field resistance is connected, gradually cutting more and more resistance into the field circuit and further increasing the speed of the motors through a range of twenty-five per cent., during which the fingers controlling the parallel contactors remain unchanged on the master controller. The several contactors are provided with an auxiliary resistance 50, normally bridged or short-circuited, and when the coil is operated this short-circuit is opened and the resistance cut in. This saves energy and prevents heating of the operating coils. Each of the coils also carries an insulated bridge piece which breaks the return circuit in its attracted position, thus providing an electrical interlock between several contactors. The action of the bridge piece of the series contactor on this over-head wiring connects wires 54 and 45 on the return circuit. A similar arrangement is provided for the bridge piece of contactor $P^1$ while $P^1$ plus $P^2$ complete an interlocking return circuit through wire 48 for the contactors A, B, C, D, E F. Similarly, the contactors A, B, C, D, E F, normally complete by bridging contacts a return circuit through a bridging contact of the series contactor controlling the return current through the point z and wire 46, and the reverse current relay carries a bridging contact 51 in a negative return circuit by way of parallel contactors and lead marked Par. 2 terminating in the contact engaged by switch 2 in its upper charging position, so that the actuation by reversal of battery energy will open the return circuit at 51 and insure the opening of the main circuit through any contactors which are holding the motors acting as generators on the batteries in charging relation. By interlocking the series and parallel contactors with the resistance contactors and with each other, no resistance controlling contactors can be operated unless either the series or parallel contactors are closed, thereby guarding against damage to the motors through any failure of the resistance contactors to function properly. As will be seen, contactors A, B, C, D E F each have an insulated bridging contact carried by its movable member at the top which normally completes the return circuit for the operating coils and through the bridging contacts of the parallel contactors. This current passes through the switch of the overload relay, an arrangement which insures safety to the system under normal operation. This circuit divides at a point 52, one branch returning by way of the bridging contacts of the series and parallel contactors by way of wires 43, 44 holding resistance, to the negative line 1, and the other branch flowing through the circuit 54, and bridging contact $j$; this latter circuit is of course opened when any of the resistance controlling contactors A, B, C, D, E, F are actuated.

With the controller in #1 position, series contactor closes over bridge on A, B, C, D, E, F, over bridge $j$ on series contactor to return wire 46 as the circuit over 42, 43, 44 resistance $h$ will not permit sufficient current to lift contactor S. Contactor S in operating opens bridge $j$ and resistance $h$ is inserted which permits sufficient current to hold contactor S in position. Bridges on A, B, C, D, E, F can then be opened and are opened by the contactors paralleling the armature resistance.

In controller position 8 $P^1$ and $P^2$ contactors should operate. This however can not be done unless contactors A, B, C, D, E, F have released and closed the overhead bridge. It is also necessary that contactor S releases and closes bridge $j$ to return wire 46 as resistance $h$ in the parallel circuit 42, 43, 44 z-46 will not permit sufficient current to operate contactors $P^1$ and $P^2$. This means of electrical interlock insures maximum resistance in the circuit and insures contactor S being open when $P^1$ and $P^2$ should close. When $P^2$ contactor closes it gives a return circuit for $P^1$ $P^2$ auxiliary current to 46 and A, B, C, D, E, F can be operated opening the overhead bridges without interfering with $P^1$ $P^2$ contactor auxiliary currents. When $P^1$ contactor closes the overhead bridge closes the circuit for auxiliary wiring for contactors A, B, C, D, E, F to return circuit 46.

The master controller for operating the contactors and for reversing motors consists of two cylinders mounted in the same casing, one being used to reverse the field circuits, and the other to control the field and armature resistance and group the motors in series or parallel as hereinbefore fully described. These two cylinders are operated by a single handle which throws 150 degrees on either side of the center for an ahead or reverse motion, respectively. The arrangement of the controller will be understood from Fig. 3, in which 60 represents the reversing cylinder, and 61 the motor operating cylinder. A single operating handle connects through a crank shaft on the reversing cylinder with a rod 62 pivoted to a gear sector 63 engaging a pinion 64 on the operating cylinder 61.

The finger board construction is of the usual form, and it has not been deemed necessary to show its structure in detail; the arrangement will be clearly understood from the diagram, Fig. 3.

When the switches 1, 2 and 3 on the motor switchboard are in the up or charging position the return negative line 1 is open and the negative line 2 from the aft battery is in position to supply the operating coils of contactors C and F and $P^1$ and $P^2$, and $18^B$ and $28^B$, functioning independently of the master controller, the field magnets being excited through the field and equalizer rheostats; and the armature shaft or shafts are clutched to the prime mover or movers. A hand operated clutch 65 is placed between the propeller shaft and the motor shaft and a similar clutch 66 is placed between the motor shaft (when operating as a generator) and the prime mover G. Thus it will be seen that the master controller gives complete mastery over the movements of the vessel and may be placed at any point selected, as the bridge, pilot house or conning tower.

It will be observed from the foregoing that when the motors are driven as generators and connected to the battery to charge the same, the main series coils 80 and 82 of the overload relay OR and reverse current relay RCR respectively carry the charging current, while the potential coils 81 and 83 of these relays are connected across the battery terminals and these relays operate upon overload or reversal of current as hereinbefore described, the operation of either of these relays serving to break the circuits of contactors which then release and break the charging circuit. The circuits of the potential coils 81 and 83 are completed, under charging conditions, through switches on the board Y so that upon opening the charging circuit at this board the circuits of the potential coils will be broken and the relays, both overload and reverse current, will be re-set. With the connections made for discharge, that is for the motors to be operated by current from the batteries, the contactor circuits will be made independently of the switch 51 of the reverse current relay so that the relay may open without interrupting the contactor circuit. The overload relay will, however, with connections for discharge, control contactor circuits which will be broken upon excess current in the series coil 80 and will be held in this condition by the potential coil 81 until the circuit of this potential coil is broken and the relays re-set as before referred to. The potential coil, with connections for discharge, has its circuit made through the reverse controller T, which is interlocked with the master controller Y so that the circuit of the coil 81 is broken and the overload relays re-set when the master controller is brought to the off position. It will be seen that the contactors which operate as circuit breakers to break the charging circuit under control of the overload and reverse current relays as described, are also employed to control the circuit through which current is supplied from the batteries to the motors so that no extra contactors, over what are required for the regulation and control of the motors deriving current from the batteries, are necessary to provide circuit breakers in the charging circuit when the motors operate as generators to charge the batteries.

Having thus described my invention, I declare that what I claim is new and desire to secure by Letters Patent is:

1. In a power generating system, the combination of a plurality of motors, a storage battery, magnetically operated contactors, comprising lifting coils, adapted to connect the motors in series and parallel relations, a circuit for supplying current to the fields of said motors, a distant master controller adapted to control the contactors and means controlled by said controller for supplying current from said battery to the said lifting coils and means controlled by said controller for supplying battery current to the fields of said motors in both forward and reverse operation of the motors, an equalizing resistance and adjusting switching means separate from said contactors and controller for balancing the motor loads.

2. In a power generating system, a plurality of motors, magnetically operated contactors for connecting the motors in series and parallel relations, a source of current supply, all at a common point or station, motor field resistance, a distant master controller for the contactors adapted to vary the motor field resistance and operate the contactors for series or parallel relation of the motors, and field discharging and load equalizing resistance in the several motor field circuits, which field circuits are governed by the master controller.

3. An operating system for electric motors, comprising a plurality of electric motors, a supply circuit, a group of contactors, for connecting the motors in series or parallel relation to the supply circuit, control circuits for said contactors, an overload relay comprising a potential winding connected across the supply circuit, a winding in series in the supply circuit, and a switch in the control circuit for the parallel contactors, a master controller governing the contactors, said controller comprising a contact for resetting the overload relay when the controller goes to off position.

4. An operating system for electric motors comprising a plurality of electric motors, a source of supply and a main circuit for supplying said motors extending from said source, a group of contactors for connecting the motors to said main circuit and in series or parallel relation, control circuits extending from said source for operating said contactors, a master controller governing said control circuits and an overload relay for opening the main and control circuits, said controller comprising means for resetting the relay at the master controller when it goes to off position.

5. An operating system for electric motors comprising a plurality of electric motors, a storage battery and a main circuit for carrying current between said motors and said battery, a group of magnetically operated contactors for connecting the motors to the main circuit and in series or parallel relation to each other, a distant controller for the contactors, control circuits extending from said controllers to the contactors, an overload relay for opening both the main and control circuits and a reverse current relay having coils opposing each other when current flows from the motors (as generators) to the battery, one of the said coils being connected in series in the main circuit, and the other across the main circuit, said reverse current relay being adapted to open both the main and control circuits on current reversal.

6. An operating system for electric motors comprising a plurality of motors, a storage battery in a plurality of sections, supply mains for the motors extending from the battery, a master controller at a distant control station, magnetic switches controlled by said controller and adapted to connect the motors in series or parallel relation, control circuits for the said magnetic switches supplied with current from said battery and controlled by said controller, a battery controller at the control station, and electrically operated switches governed by the battery controller for throwing the battery sections in series or parallel, and connecting them to the supply mains for the motors.

7. A propulsion system for ships comprising multiple propellers and a plurality of operating motors for each propeller shaft, a plurality of storage batteries, a group of electrically operated contactors corresponding to each shaft and controlling the motors driving the same, each of said groups of contactors adapted to connect the motors of its set in series or parallel and a single distant master controller common to the contactors of all the motor sets, and circuit connections controlled by the contactors for conveying current from any or all of said storage batteries to the motors of all the sets.

8. In a power generating system, a plurality of motors, a main circuit for supplying the motors with current, magnetically operated contactors adapted to connect the motors in series or parallel, a distant controller for the contactors, an overload relay having a winding in the main circuit and governing said circuit through the contactors, and a reverse current relay governing the circuit of the parallel motor contactors.

9. In a power generating system, a plurality of motors, a main circuit for supplying the motors with current, magnetically operated contactors adapted to connect the motors in series or parallel, a contactor operating circuit and a master controller for the contactor operating circuit comprising a speed control cylinder and reversing cylinder located at a distant point and operated by a single handle.

10. In a power generating system, the combination of a plurality of motors, a sectional storage battery as a source of current supply, contactors for conveying operating current to the motors, bus-bars receiving energy from said battery, a group of magnetically operated contactors adapted to connect the motors in series or parallel, electrically operated switches for coupling the battery sections in series or parallel and with the bus-bars, all located adjacent to each other at a common station, a manually operated controller at a distant station controlling current supplied by the same source through control wires to operate the contactors and couple the motors locally in series or parallel relation and with a storage battery, said control wires being small with relation to the motor supply conductors.

11. In an electric power system, the combination with a motor, of a storage battery, circuits for conveying current between the battery and the motor, electromagnetically operated contactors controlling the said circuits, there being a contactor corresponding to each step of the motor control, control circuits for conveying current from the storage battery to the said contactors, a master controller controlling the said control circuits and means for alternately completing the control circuit of said contactors through said master controller and completing the control circuit of certain of said contactors independently of said controller.

In testimony whereof I affix my signature, in presence of two witnesses.

GEORGE A. PIERCE.

Witnesses:
ALBERT H. THOMAS,
GEORGE L. GARDNER.

Copies of this patent may be obtained for five cents each, by addressing the "Commissioner of Patents Washington, D. C."